Figure 1:
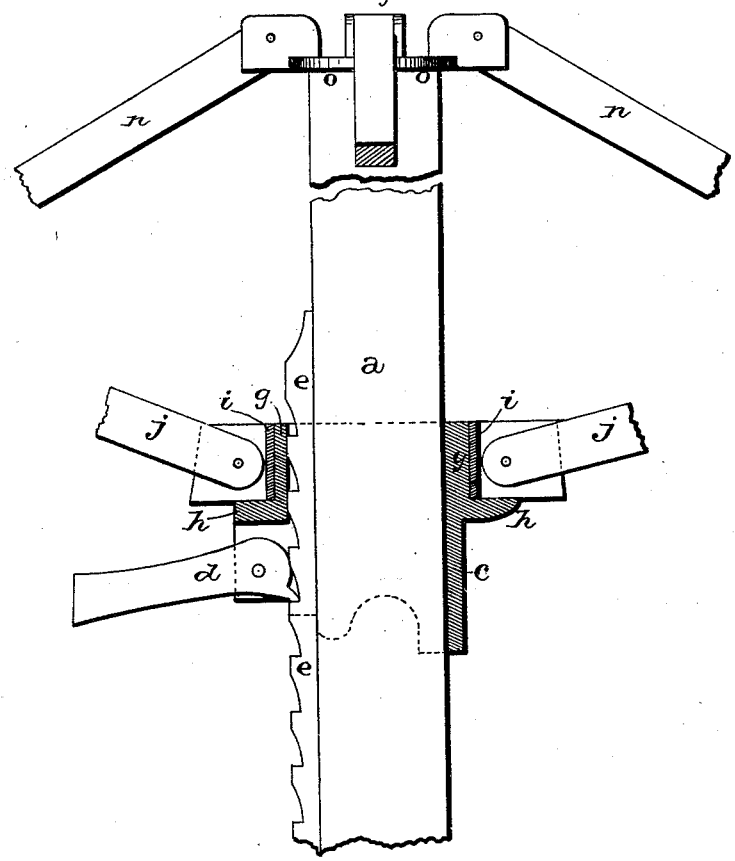
Figure 2:
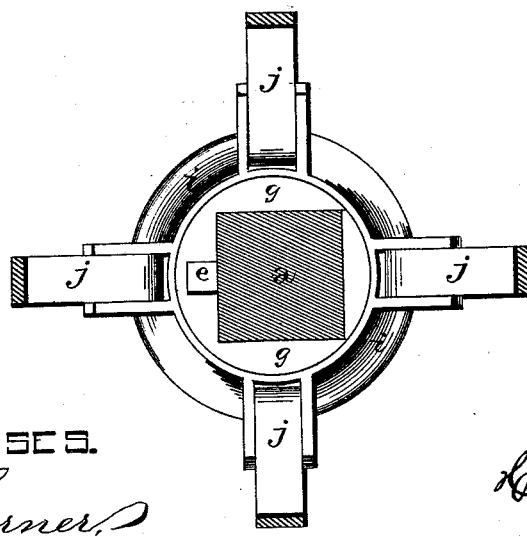

H. J. BROWN.
CLOTHES-DRIER.

No. 170,812.  Patented Dec. 7, 1875.

WITNESSES.  
J. Wm. Garner  
Jno. Irwin Jr.

INVENTOR.  
H. J. Brown  
per  
F. A. Lehmann, Atty.

UNITED STATES PATENT OFFICE.

HENRY J. BROWN, OF TROY, NEW HAMPSHIRE.

IMPROVEMENT IN CLOTHES-DRIERS.

Specification forming part of Letters Patent No. 170,812, dated December 7, 1875; application filed August 11, 1875.

*To all whom it may concern:*

Be it known that I, HENRY J. BROWN, of Troy, in the county of Cheshire and State of New Hampshire, have invented certain new and useful Improvements in Clothes-Driers; and I do hereby declare the following to be a full, clear, and exact description of the invention, such as will enable others skilled in the art to which it pertains to make and use it, reference being had to the accompanying drawings, which form part of this specification.

This invention relates to an improvement in clothes-driers; and it consists in the arrangement and combination of parts that will be more fully described hereafter, whereby the reel can be freely rotated around without chafing the post, and supported in any desired position when the arms are extended.

The accompanying drawing represents my invention.

$a$ represents a square post of any desired size and height, which is intended to be placed in a suitable socket in the ground, or provided with suitable feet so that it will stand by itself. Over this post is passed the collar $c$, which has a square opening through it, so that it cannot turn upon and chafe the post as it is moved up and down. Pivoted between suitable ears, formed upon one side of this collar, is the catch $d$, which catches in the rack $e$, the outer end of which catch forms a handle, both for disengaging it and for making the inner end automatically engage with the rack as the collar is raised upward. The upper end of the collar $c$ is made perfectly round upon its outer side, so as to form a tenon, $g$, and has a shoulder, $h$, cast around it, at the base of the tenon, to prevent the rotary collar from passing downward too far. The rotary collar $i$ fits like a socket over the tenon, and has any desired number of arms, $j$, pivoted to it, to which arms are attached, in any suitable manner, the rope for supporting the clothes. The arms $j$ are connected by the rods $n$ with the revolving cap-plate $o$ on the top of the post.

It will be readily seen, from this arrangement of parts, that the arms can be rotated readily around without any friction or wear on the post.

I am aware that a divided collar has been used for encircling the post, that requires to be hooked on one side and clamped together by a screw on the other, and this I disclaim.

My invention consists in forming the collar in one solid piece, and forming a flange, $g$, as a bearing for the ring $i$, so as to hold the ring in position, and preventing it from rocking and the arms from sagging down on the side, as they will do when the collar is not properly held.

Having thus described my invention, I claim—

The collar $c$, made in one solid piece, having the shoulder $h$ and vertical flange $g$, around which flange the collar $i$ snugly fits, so as to hold the collar in position, in combination with the catch $d$, rack $e$, arms $j$, rods $n$, and cap $o$, substantially as shown and described.

In testimony that I claim the foregoing I have hereunto set my hand and seal this 3d day of August, 1875.

HENRY J. BROWN. [L. S.]

Witnesses:
 E. P. KIMBALL,
 C. C. SMITH.